(12) United States Patent
Xu et al.

(10) Patent No.: US 11,597,885 B2
(45) Date of Patent: Mar. 7, 2023

(54) METHODS OF WHOLE CRUDE AND WHOLE CRUDE WIDE CUT HYDROTREATING AND DEWAXING LOW HETROATOM CONTENT PETROLEUM

(71) Applicant: EXXONMOBIL TECHNOLOGY AND ENGINEERING COMPANY, Annandale, NJ (US)

(72) Inventors: Xiaochun Xu, Basking Ridge, NJ (US); Xinrui Yu, Furlong, PA (US); Shifang Luo, Annandale, NJ (US); Randolph J. Smiley, Hellertown, PA (US); Joseph E. Gatt, Annandale, NJ (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 17/364,989

(22) Filed: Jul. 1, 2021

(65) Prior Publication Data

US 2022/0025282 A1    Jan. 27, 2022

Related U.S. Application Data

(60) Provisional application No. 63/054,587, filed on Jul. 21, 2020.

(51) Int. Cl.
*C10G 67/14*    (2006.01)
*C10G 69/04*    (2006.01)
(Continued)

(52) U.S. Cl.
CPC .............. *C10G 67/14* (2013.01); *B01D 3/06* (2013.01); *B01D 3/148* (2013.01); *C10G 69/04* (2013.01);
(Continued)

(58) Field of Classification Search
CPC .... B01D 3/06; B01D 3/148; C10G 2300/202; C10G 2300/301; C10G 2300/304;
(Continued)

(56) References Cited

U.S. PATENT DOCUMENTS 4,818,369 A    4/1989   Bortz
2015/0175911 A1  6/2015  Shih et al.
(Continued)

FOREIGN PATENT DOCUMENTS

EP    0251433 A2   1/1987
EP    0 752 460 A1  1/1997
(Continued)

OTHER PUBLICATIONS

International Search Report and Written Opinion PCT/US2021/04230 dated Sep. 24, 2021.
(Continued)

*Primary Examiner* — Ellen M McAvoy
*Assistant Examiner* — Chantel L Graham
(74) *Attorney, Agent, or Firm* — Shook, Hardy & Bacon L.L.P.

(57)    ABSTRACT

Methods of refining a whole crude oil stream. The methods involve first processing the crude either through a hydrotreating reactor comprising a dewaxing reactor bed or a flash evaporation separator. The treated streams are then further processed through a demetalization reactor bed, a hydroprocessing reactor bed, or both. The stream can then be still further processed via additional hydrotreating, distillation, or both.

24 Claims, 9 Drawing Sheets

(51) Int. Cl.
    *C10L 1/08*     (2006.01)
    *B01D 3/14*     (2006.01)
    *B01D 3/06*     (2006.01)

(52) U.S. Cl.
    CPC .......... *C10L 1/08* (2013.01); *C10G 2300/202* (2013.01); *C10G 2300/301* (2013.01); *C10G 2300/304* (2013.01); *C10G 2300/307* (2013.01); *C10G 2300/308* (2013.01); *C10G 2300/4006* (2013.01); *C10G 2300/4012* (2013.01); *C10G 2300/4018* (2013.01); *C10G 2400/04* (2013.01); *C10G 2400/08* (2013.01); *C10L 2200/0446* (2013.01); *C10L 2270/026* (2013.01); *C10L 2290/24* (2013.01)

(58) Field of Classification Search
    CPC ........ C10G 2300/307; C10G 2300/308; C10G 2300/4006; C10G 2300/4012; C10G 2300/4018; C10G 2400/04; C10G 2400/08; C10G 65/043; C10G 67/14; C10G 69/04; C10L 1/08; C10L 2200/0446; C10L 2270/026; C10L 2290/24
See application file for complete search history.

(56) References Cited

U.S. PATENT DOCUMENTS

2016/0122664 A1    5/2016    Thakkar
2018/0142172 A1    5/2018    Gosling et al.
2018/0355264 A1*  12/2018    Brown ............... C10G 67/0418

FOREIGN PATENT DOCUMENTS

JP          H07-305077 A        11/1995
WO         2013184545 A1      12/2013
WO     WO-2013184545 A1 *  12/2013    ............... C10G 3/47
WO         2018/094336 A1     5/2018

OTHER PUBLICATIONS

International Search Report and Written Opinion received in PCT Application No. PCT/US2021/033587 dated Sep. 3, 2021, 12 pages.
International Search Report and Written Opinion received for PCT Application No. PCT/US2021/040230 dated Sep. 24, 2021, 12 pages.
Non-Final Office Action dated Jun. 27, 2022 in U.S. Appl. No. 17/325,996, 9 pages.

* cited by examiner

METHODS OF WHOLE CRUDE AND WHOLE CRUDE WIDE CUT HYDROTREATING AND DEWAXING LOW HETROATOM CONTENT PETROLEUM

CROSS REFERENCE TO RELATED APPLICATIONS

This application claims the benefit of U.S. Provisional Application No. 63/054,587, filed on Jul. 21, 2020, the entire contents of which are incorporated herein by reference.

FIELD OF THE INVENTION

The present disclosure relates to methods of whole crude and whole crude wide cut hydrotreating and dewaxing low heteroatom content petroleum.

BACKGROUND OF THE INVENTION

Conventional crude oil supplies tend to be sour heavy crude. That is crude oil high in heteroatoms (e.g., sulfur, nitrogen) and other contaminates. Refining sour heavy crude conventionally comprises heating and distilling the crude oil into separate product streams. The product streams are then individually hydrotreated to reduce sulfur and other contaminants. This step is especially important in light of modern low sulfur fuel requirements. However, the multiple hydrotreating reactors consume significant quantities of hydrogen and have a high operational energy cost/carbon footprint.

Tight oil, also known as shale oil, is light sweet crude with a low heteroatom content. Development of hydraulic fracturing and horizontal well drilling technologies has significantly increased the supply of tight oil available for refining. Refining tight oil in process flows originally developed for conventional crude oil may be inefficient. The low contamination levels of tight oil may present opportunities to reconfigure traditional crude oil process flows by reordering and/or eliminating some process and thus reduce capital investment, operational energy cost/carbon footprint and maximize revenue.

SUMMARY OF THE INVENTION

The present disclosure relates to methods of hydrotreating whole crude and whole crude wide cut low heteroatom content petroleum.

In an aspect, the methods of refining a whole crude oil include: feeding a whole crude oil stream into a hydrotreating reactor comprising a dewaxing reactor bed and one or more selected from a group consisting of a demetalization reactor bed and a hydroprocessing reactor bed; processing the whole crude oil stream within the hydrotreating reactor to create a treated stream;

feeding the treated stream into the distillation tower; and processing the treated stream within the distillation tower to create one or more petroleum distillate streams.

In another aspect, methods of refining a whole crude oil stream include feeding the whole crude oil stream into a flash evaporation separator; processing the whole crude oil stream within the flash evaporation separator to create a plurality of flashed streams comprising at least one of a light ends stream, a flashed naphtha stream, and a kero plus stream; feeding the kero plus stream into a hydrotreating reactor comprising a dewaxing reactor bed and one or more selected from a group consisting of a demetalization reactor bed and a hydroprocessing reactor bed; processing the kero plus stream within the hydrotreating reactor to create a treated stream; and processing the treated stream within the distillation tower.

In another aspect, methods of refining a whole crude oil stream include feeding the whole crude oil stream into a flash evaporation separator to create a flash light ends stream, a flash middle stream, and a flash heavy ends stream; processing the flash middle stream within a hydrotreating reactor a hydrotreating reactor comprising a dewaxing reactor bed and one or more selected from a group consisting of a demetalization reactor bed and a hydroprocessing reactor bed to create a treated stream; feeding the treated stream into the distillation tower; and processing the treated stream within the distillation tower to create one or more petroleum distillate streams.

In another aspect, methods of refining a whole crude oil stream include feeding the whole crude oil stream into a flash evaporation separator to create a flash light ends stream and a flash heavy ends stream; processing the flash light ends stream within a hydrotreating reactor a hydrotreating reactor comprising a dewaxing reactor bed and one or more selected from a group consisting of a demetalization reactor bed and a hydroprocessing reactor bed to create a treated stream; feeding the treated stream into the distillation tower; and processing the treated stream within the distillation tower to create one or more petroleum distillate streams.

BRIEF DESCRIPTION OF THE DRAWINGS

The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION OF THE INVENTION

The present disclosure relates to methods of whole crude and whole crude wide cut hydrotreating and dewaxing of a low heteroatom content petroleum. In an aspect, whole crude hydrotreating and dewaxing includes treatment of a whole crude petroleum before distillation. Whole crude wide cut hydrotreating can include flash separating and then hydrotreating and dewaxing a whole crude petroleum before distillation.

There are numerous advantages to hydrotreating a whole crude petroleum having low heteroatom content (tight oil) before distillation. Whole crude tight oil may be hydrotreated by a single reactor before distillation because of the low contamination content. Placing a single hydrotreating reactor before a distillation tower eliminates the need for independent hydrotreating reactors on each distilled product stream, which reduces capital building and maintenance expenditures. When combined with dewaxing treatments, the final distillation cut points for hydrotreated fractions can be extended (e.g., diesel), which can result in improved overall yield and quality. In addition, cold flow properties of the fractions are also improved as paraffins and waxy components are converted and/or removed.

Also, a single pre-distillation tower hydrotreating reactor consumes significantly less energy compared to operating multiple hydrotreating reactors post-distillation. The whole crude hydrotreating of tight oil is also hydrogen self-sufficient. The hydrogen consumption is only about 20% of the amount generated by the reformer. The excess hydrogen generated by the reformer may be supplied to other processes in the refinery, further reducing the overall carbon footprint.

Whole crude wide cut hydrotreating has further advantages over whole crude hydrotreating. Tight oil generally has a high naphtha fraction (typically 30-50 wt %) and low sulfur content. Flash evaporating tight oil separates it to light ends, naphtha, and a kero plus remainder fraction. While the low sulfur content of tight oil may permit the naphtha fraction go directly from the flash evaporation separator to a reformer without hydrotreating, but hydrotreating the naphtha fraction is preferred. Naphtha is typically vaporized in hydrotreating reactors, which reduces the hydrogen partial pressure and negatively impacts performance. Separating the naphtha before hydrotreating improves the reactor performance, while significantly reducing the required reactor size.

Flash evaporation, hydrotreating, and dewaxing whole crude tight oil will also minimize fouling and corrosion in the atmospheric distillation unit and catalyst poisoning downstream, which further reduces operational expenses. Other advantages may be further achieved by the present disclosure.

Definitions and Test Methods

As used in the present disclosure and claims, the singular forms "a," "an," and "the" include plural forms unless the context clearly dictates otherwise.

The term "and/or" as used in a phrase such as "A and/or B" herein is intended to include "A and B", "A or B", "A", and "B".

As used herein, a reference to a "$C_x$" fraction, stream, portion, feed, or other quantity is defined as a fraction (or other quantity) where 50 vol % or more of the fraction corresponds to hydrocarbons having "x" number of carbons. When a range is specified, such as "$C_x$-$C_y$", 50 vol % or more of the fraction corresponds to hydrocarbons having a number of carbons from "x" to "y". A specification of "$C_{x+}$" (or "$C_{x-}$") corresponds to a fraction where 50 vol % or more of the fraction corresponds to hydrocarbons having the specified number of carbons or more (or the specified number of carbons or less).

The term "hydrocarbon" means a class of compounds containing hydrogen bound to carbon, and encompasses (i) saturated hydrocarbon, (ii) unsaturated hydrocarbon, (iii) mixtures of hydrocarbons, and including mixtures of hydrocarbon compounds (saturated and/or unsaturated) having different values of n.

As used herein, "feedstock" and "feed" (and grammatical derivatives thereof) are used interchangeably and both refer to a composition that is fed into a reactor. A feedstock may optionally have been pre-treated to modify its disposition.

The term "reactor," and grammatical derivatives thereof, refers to a vessel comprising one or more catalyst beds.

Tight Oil

Tight oil (also known as shale oil, shale-hosted oil, or light tight oil) is a light sweet crude oil contained in petroleum bearing formations of low permeability. The development of hydraulic fracturing and horizontal well drilling technology has significantly increased the domestic production of tight oil and thus incentivized developing efficient refining processes to optimize financial returns. Table 1 below shows properties of a typical tight oil.

TABLE 1

| | |
|---|---|
| API | 48.5 |
| Total Sulfur, wt % | 0.012 |
| Aliphatic Sulfur wt % | 0.004 |
| Nitrogen ppm | 42.5 |
| Basic Nitrogen, ppm | 16.5 |
| Aromatics, wt % | 7.8 |
| Paraffins, wt % | 49.4 |
| Naphthenes, wt % | 42.8 |
| ASTM D2887, ° F. | |
| 5 wt % | 137 |
| 10 wt % | 178 |
| 30 wt % | 298 |
| 50 wt % | 421 |
| 70 wt % | 587 |
| 90 wt % | 822 |
| 95 wt % | 912 |

ASTM D2887 refers to the method titled "Standard Test Method For Boiling Range Distribution Of Petroleum Fractions By Gas Chromatography," such that the numbers above refer to the fact that 5 wt % of the tight oil boils at 137° F. (T5) and 95 wt % of the tight oil boils by 912° F. (T95).

Further, oil having an API gravity above 31.1° is considered light crude. Oil having an API gravity between 40° and 50° commands the highest price. Referring to Table 1 above, the API gravity of the typical tight oil sample was about 48.5°. Sweet crude oil generally has less than 0.5 wt % sulfur. Typical tight oil also has very low sulfur, with the sample tested above in Table 1 showing 0.012 wt % sulfur. Another useful property of tight oil is the naphthene composition, with the sample tested above in Table 1 showing a naphthene concentration of 42.8 wt %.

Flash Evaporation Separator

The term "flashing" or "flash separator" "flash evaporation" are used as a general process term descriptive of the process of removing components of crude oil via heating and/or depressurization that results in vaporizing volatile components from the liquid state. Of note, when flashing the naphtha flash temperature is generally 300-350° F. but can be as high as 430° F. For wider-cut flash points, light ends and naphtha flash from the initial boiling point (IBP) to about 350° F. and kerosene and above flash from about 350° F. to the final boiling point.

Hydrotreating

The term "hydrotreating" is used as a general process term descriptive of the reactions in which a prevailing degree of hydrodesulfurization, hydrodenitrogenation and hydrodeoxygenation occurs. Olefins saturation and aromatic saturation take place as well and its degree depends on the catalyst and operating conditions selected.

The catalysts used for hydrotreatment can include conventional hydroprocessing catalysts, such as those that comprise at least one Group VIII non-noble metal (Columns 8-10 of IUPAC periodic table), preferably Fe, Co, and/or Ni, such as Co and/or Ni; and at least one Group VIB metal (Column 6 of IUPAC periodic table), preferably Mo and/or W. Such hydroprocessing catalysts can optionally include transition metal sulfides. These metals or mixtures of metals are typically present as oxides or sulfides on refractory metal oxide supports. Suitable metal oxide supports include low acidic oxides such as silica, alumina, titania, silica-titania, and titania-alumina. Suitable aluminas are porous aluminas such as gamma or eta having average pore sizes from 50 to 200 Å, or 75 to 150 Å; a surface area from 100 to 300 $m^2/g$, or 150 to 250 $m^2/g$; and a pore volume of from 0.25 to 1.0 $cm^3/g$, or 0.35 to 0.8 $cm^3/g$. The supports are preferably not promoted with a halogen such as fluorine as this generally increases the acidity of the support.

The at least one Group VIII non-noble metal, in oxide form, can typically be present in an amount ranging from about 2 wt % to about 40 wt %, preferably from about 4 wt % to about 15 wt %. The at least one Group VIB metal, in oxide form, can typically be present in an amount ranging from about 2 wt % to about 70 wt %, preferably for supported catalysts from about 6 wt % to about 40 wt % or from about 10 wt % to about 30 wt %. These weight percents are based on the total weight of the catalyst. Suitable metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina, silica, silica-alumina, or titania.

Alternatively, the hydrotreating catalyst can be a bulk metal catalyst, or a combination of stacked beds of supported and bulk metal catalyst. By bulk metal, it is meant that the catalysts are unsupported wherein the bulk catalyst particles comprise 30-100 wt. % of at least one Group VIII non-noble metal and at least one Group VIB metal, based on the total weight of the bulk catalyst particles, calculated as metal oxides and wherein the bulk catalyst particles have a surface area of at least 10 $m^2/g$. It is furthermore preferred that the bulk metal hydrotreating catalysts used herein comprise about 50 to about 100 wt %, and even more preferably about 70 to about 100 wt %, of at least one Group VIII non-noble metal and at least one Group VIB metal, based on the total weight of the particles, calculated as metal oxides.

Bulk catalyst compositions comprising one Group VIII non-noble metal and two Group VIB metals are preferred. It has been found that in this case, the bulk catalyst particles are sintering-resistant. Thus, the active surface area of the bulk catalyst particles is maintained during use. The molar ratio of Group VIB to Group VIII non-noble metals ranges generally from 10:1-1:10 and preferably from 3:1-1:3. In the case of a core-shell structured particle, these ratios of course apply to the metals contained in the shell. If more than one Group VIB metal is contained in the bulk catalyst particles, the ratio of the different Group VIB metals is generally not critical. The same holds when more than one Group VIII non-noble metal is applied. In the case where molybdenum and tungsten are present as Group VIB metals, the molybdenum:tungsten ratio preferably lies in the range of 9:1-1:9. Preferably the Group VIII non-noble metal comprises nickel and/or cobalt. It is further preferred that the Group VIB metal comprises a combination of molybdenum and tungsten. Preferably, combinations of nickel/molybdenum/tungsten and cobalt/molybdenum/tungsten and nickel/cobalt/molybdenum/tungsten are used. These types of precipitates appear to be sinter-resistant. Thus, the active surface area of the precipitate is maintained during use. The metals are preferably present as oxidic compounds of the corresponding metals, or if the catalyst composition has been sulfided, sulfidic compounds of the corresponding metals.

It is also preferred that the bulk metal hydrotreating catalysts used herein have a surface area of at least 50 $m^2/g$ and more preferably of at least 100 $m^2/g$. It is also desired that the pore size distribution of the bulk metal hydrotreating catalysts be approximately the same as the one of conventional hydrotreating catalysts. Bulk metal hydrotreating catalysts have a pore volume of 0.05-5 ml/g, or of 0.1-4 ml/g, or of 0.1-3 ml/g, or of 0.1-2 ml/g determined by nitrogen adsorption. Preferably, pores smaller than 1 nm are not present. The bulk metal hydrotreating catalysts can have a median diameter of at least 100 nm. The bulk metal hydrotreating catalysts can have a median diameter of not more than 5000 μm, or not more than 3000 μm. In an embodiment, the median particle diameter lies in the range of 0.1-50 μm and most preferably in the range of 0.5-50 μm.

The hydrotreatment is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen containing "treat gas," is provided to the reaction zone. Treat gas, as referred to in this invention, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane), and which will not adversely interfere with or affect either the reactions or the products. Impurities, such as $H_2S$ and $NH_3$ are undesirable and would typically be removed from the treat gas before it is conducted to the reactor. The treat gas stream introduced into a reaction stage will preferably contain at least about 50 vol. % and more preferably at least about 75 vol. % hydrogen.

Hydrotreating conditions can include temperatures of about 200° C. to about 450° C., or about 315° C. to about 425° C.; pressures of about 250 psig (1.8 MPag) to about 3500 psig (34.6 MPag) or about 300 psig (2.1 MPag) to about 3000 psig (20.8 MPag); liquid hourly space velocities (LHSV) of about 0.1 $hr^{-1}$ to about 5 $hr^{-1}$; and hydrogen treat gas rates of about 200 scf/B (35.6 $m^3/m^3$) to about 10,000 scf/B (1781 $m^3/m^3$), or about 500 (89 $m^3/m^3$) to about 10,000 scf/B (1781 $m^3/m^3$).

Because the hydrotreatment reactions that take place in this step are exothermic, a rise in temperature takes place along the reactor. The conditions in the hydrodesulfurization step may be adjusted to obtain the desired degree of desulfurization. A temperature rise of about 5° F. to about 200° F. is typical under most hydrotreating conditions and with reactor inlet temperatures in the 500° F. to 800° F. range.

Dewaxing

In some aspects, a dewaxing catalyst can also be included for dewaxing of the effluent from the hydrotreating of the whole crude or whole crude wide cut. Suitable dewaxing catalysts can include molecular sieves such as crystalline aluminosilicates (zeolites). In an embodiment, the molecular sieve can comprise, consist essentially of, or be ZSM-5, ZSM-22, ZSM-23, ZSM-35, ZSM-48, zeolite Beta, ZSM-57, or a combination thereof, for example ZSM-23 and/or ZSM-48, or ZSM-48 and/or zeolite Beta. Optionally but preferably, molecular sieves that are selective for dewaxing by isomerization as opposed to cracking can be used, such as ZSM-48, zeolite Beta, ZSM-23, or a combination thereof. Additionally or alternately, the molecular sieve can comprise, consist essentially of or be a 10-member ring 1-D molecular sieve. Examples include EU-1, ZSM-35 (or ferrierite), ZSM-11, ZSM-57, NU-87, SAPO-11, ZSM-48, ZSM-23, and ZSM-22. Preferred materials are EV-2, EU-11, ZBM-30, ZSM-48, or ZSM-23. Note that a zeolite having the ZSM-23 structure with a silica to alumina ratio of from about 20:1 to about 40:1 can sometimes be referred to as SSZ-32. Other molecular sieves that are isostructural with the above materials include Theta-1, NU-10, EU-13, KZ-1, and NU-23. Optionally, the dewaxing catalyst can include a binder for the molecular sieve, such as alumina, titania, silica, silica-alumina, zirconia, or a combination thereof, for example alumina and/or titania or silica and/or zirconia and/or titania.

Dewaxing catalysts disclosed herein can include catalysts with a low ratio of silica to alumina. For example, for ZSM-48, the ratio of silica to alumina in the zeolite can be less than 200:1, or less than 110:1, or less than 100:1, or less than 90:1, or less than 80:1. In various embodiments, the ratio of silica to alumina can be from 30:1 to 200:1, 60:1 to 110:1, or 70:1 to 100:1.

In some embodiments, dewaxing catalysts also contain a metal component, including noble metals such as Pt or a combination of Group VIB and Group VIIIB metals-similar to those used in the hydrotreating catalysts.

Process conditions in a catalytic dewaxing zone can include a temperature of about 200° C. to about 450° C. or about 270° C. to about 400° C., a hydrogen partial pressure of about 1.8 MPag to about 34.6 MPag (250 psig to 5000 psig) or about 4.8 MPag to about 20.8 MPag, and a hydrogen treat gas rate of about 35.6 $m^3/m^3$ (200 SCF/B) to about 1781 $m^3/m^3$ (10,000 scf/B) or about 178 $m^3/m^3$ (1000 SCF/B) to about 890.6 $m^3/m^3$ (5000 SCF/B). In still other embodiments, the conditions can include temperatures in the range of about 600° F. (343° C.) to about 815° F. (435° C.), hydrogen partial pressures of from about 500 psig to about 3000 psig (3.5 MPag-20.9 MPag), and hydrogen treat gas rates of from about 213 $m^3/m^3$ to about 1068 $m^3/m^3$ (1200 SCF. The LHSV can be from about 0.1 $h^{-1}$ to about from about 0.5 $h^{-1}$ to about 5 $h^{-1}$ and/or from about 1 $h^{-1}$ to about 4 $h^{-1}$.

Figure 1:
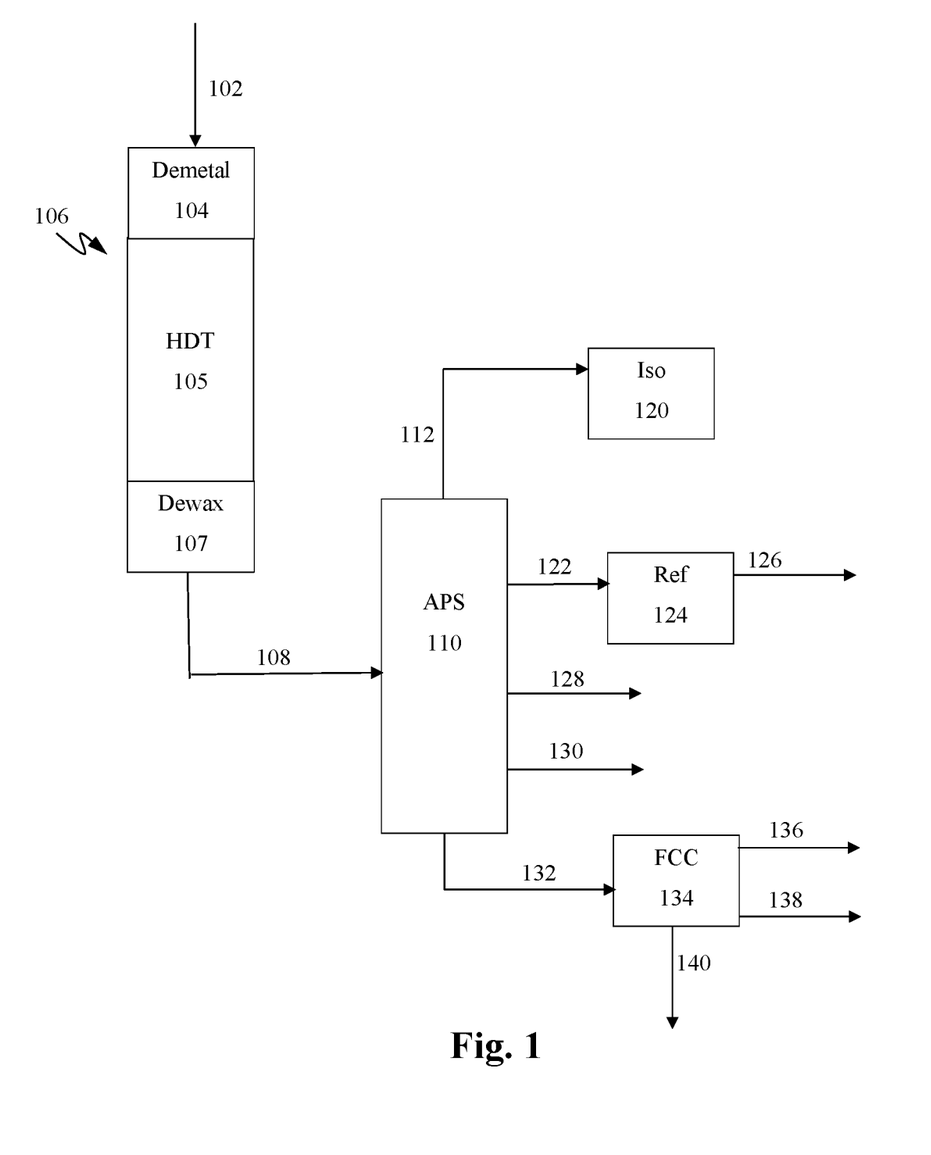
FIG. 1 illustrates a whole crude hydrotreating process flow.

Turning now to FIG. 1, a schematic representation of a whole crude hydrotreating process flow for low heteroatom content petroleum is illustrated. A whole crude tight oil stream 102 is first processed through a hydrotreating reactor 106 including multiple zones and/or reactor beds. As illustrated in FIG. 1, hydrotreating reactor 106 is configured with a demetalization reactor bed 104, a hydroprocessing reactor bed 105, and a dewaxing reactor bed 107. During hydrotreatment, whole crude tight oil stream 102 contacts demetalization reactor bed 104 first in this embodiment. Demetalization reactor bed 104 can include a traditional demetalization catalytic process known to one of ordinary skill in the art. Tight oil may contain higher iron and calcium content than conventional crude. Tight oil metal content may include calcium from 0.5-20 ppm, iron from 0.1-8.5 ppm, nickel from 0-0.5 ppm, and vanadium from 0-1.3 ppm. After flowing through the demetalization reactor bed 104, the whole crude tight oil petroleum stream 102 is then processed in a hydrotreating bed 105 and a dewaxing reactor bed 107. A treated stream 108 is created following treatment and flows from the hydrotreating reactor 106 to be processed in an atmospheric distillation tower 110. There the treated stream 108 is distilled into multiple petroleum distillate streams.

A first petroleum distillate stream 112, comprising atmospheric top end distillates and partially isomerized light virgin naptha (LVN) can be routed to various processing units, including an isomerization unit 120. A second petroleum distillate stream 122, comprising primarily naphtha, flows from the atmospheric distillation tower 110 to a naphtha upgrading process, such as isomerization and reformer processes 124. The second petroleum distillate stream 122 may be further processed in the naphtha upgrading reformer 124 to produce a reformed stream 126, which may comprise low sulfur high-octane gasoline and/or pure chemical feedstocks (benzene, toluene, xylene, which may also be known as BTX). Hydrogen generated from reformation process can be used in the whole crude hydrotreating. The second petroleum distillate stream 122 may also be further processed using the combination of isomerization and reformer, in which light naphtha (C5-C7) is isomerized and heavy naphtha (C7+) is processed using reformer. A third petroleum distillate stream 128, comprising ultralow sulfur kerosene (ULSK) is also formed, in some cases the ULSK stream may flow directly to fuel stocks without requiring further processing. A fourth petroleum distillate stream 130 is also formed, comprising ultralow-sulfur diesel (ULSD), it too may flow directly to fuel stocks without requiring further processing.

A fifth petroleum distillate stream 132 comprising the atmospheric bottom end may flow directly into a fluid catalytic cracker 134 (FCC). Hydrotreating the whole crude tight oil stream 102 before fractioning in the atmospheric distillation tower 110 results in the fifth petroleum distillate stream 132 having low sulfur, nitrogen, and aromatics. The high quality (low contamination) of the fifth petroleum distillate stream 132 flowing into the FCC 134 results in high quality (low contamination) FCC product streams that may be directly blended to other product streams without further processing. Leaving the FCC 134 is naphtha stream 136, low sulfur light cycle oil (LCO) stream 138, and low sulfur slurry oil stream 140. The naphtha stream 136 may be directly blended with gasoline from the reformer stream 126. A light cycle oil stream 138 may flow from the FCC to be directly blended with ULSD from the fourth petroleum distillate stream 130. A very low sulfur slurry oil product stream 140 may be sold as fuel for Emission Control Area (ECA) fuel and/or used as a blending component for low sulfur Marine Gas Oil (MGO).

Figure 2:
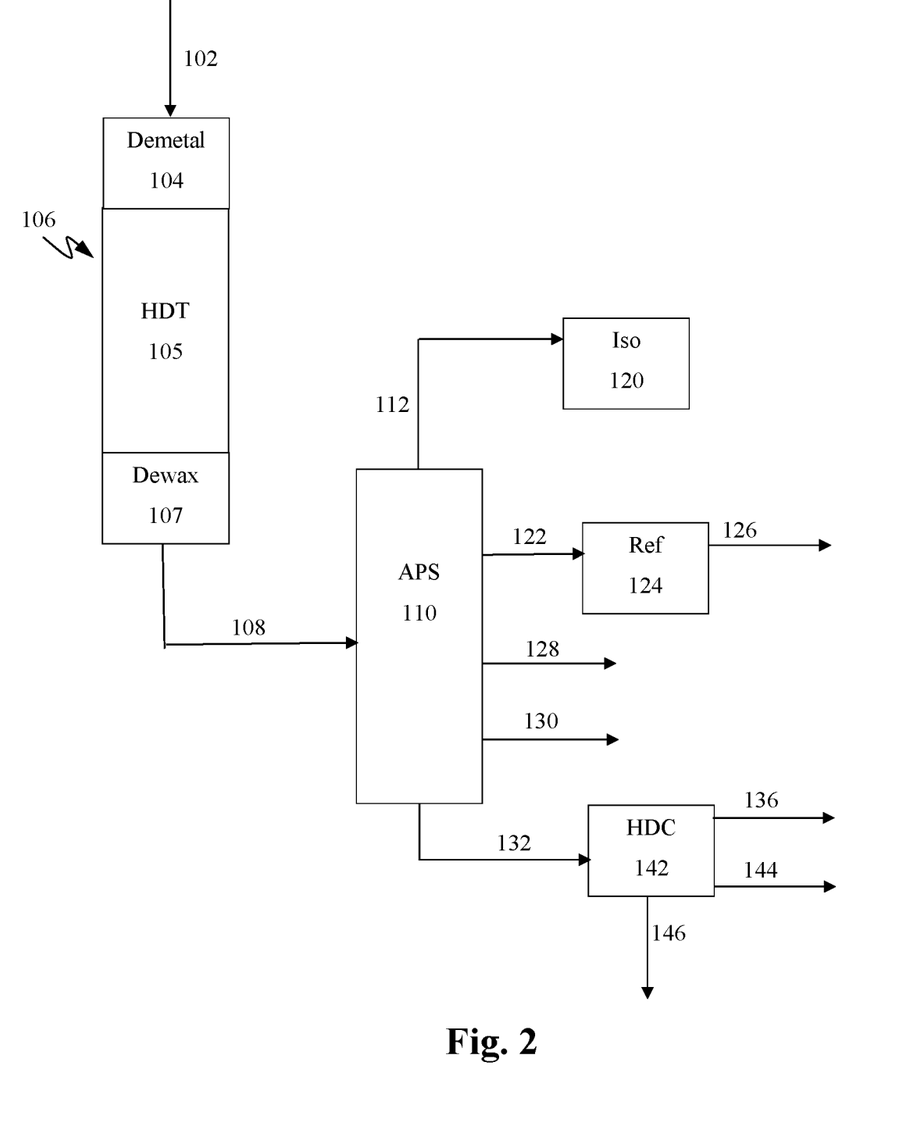
FIG. 2 depicts another aspect of a whole crude hydrotreating process flow.

It is contemplated that hydrotreating the whole crude tight oil stream 102, which begins as a low heteroatom content petroleum, provides flexibility in processing depending on the desired distillation products. FIG. 2 depicts another process flow for refining low heteroatom content petroleum with a different configuration for processing the fifth petroleum distillate stream 132 (atmospheric bottom end). References numbers that are shared between the figures refer to the same elements across the figures. The low nitrogen content of the fifth petroleum distillate stream 132 allows for replacing the FCC 134 with a hydrocracker 142 (HDC) capable of producing several different product streams without any pretreatment. Just as with FCC 134, HDC 142 is shown as producing three product streams. The first two are the same as produced in FIG. 1: naphtha stream 136 and diesel stream 144. The third product stream from HDC 142 is a lubricant product stream 146, which may comprise a variety of different products depending on process configuration and catalyst choice may be produced by the HDC 142.

Figure 3:
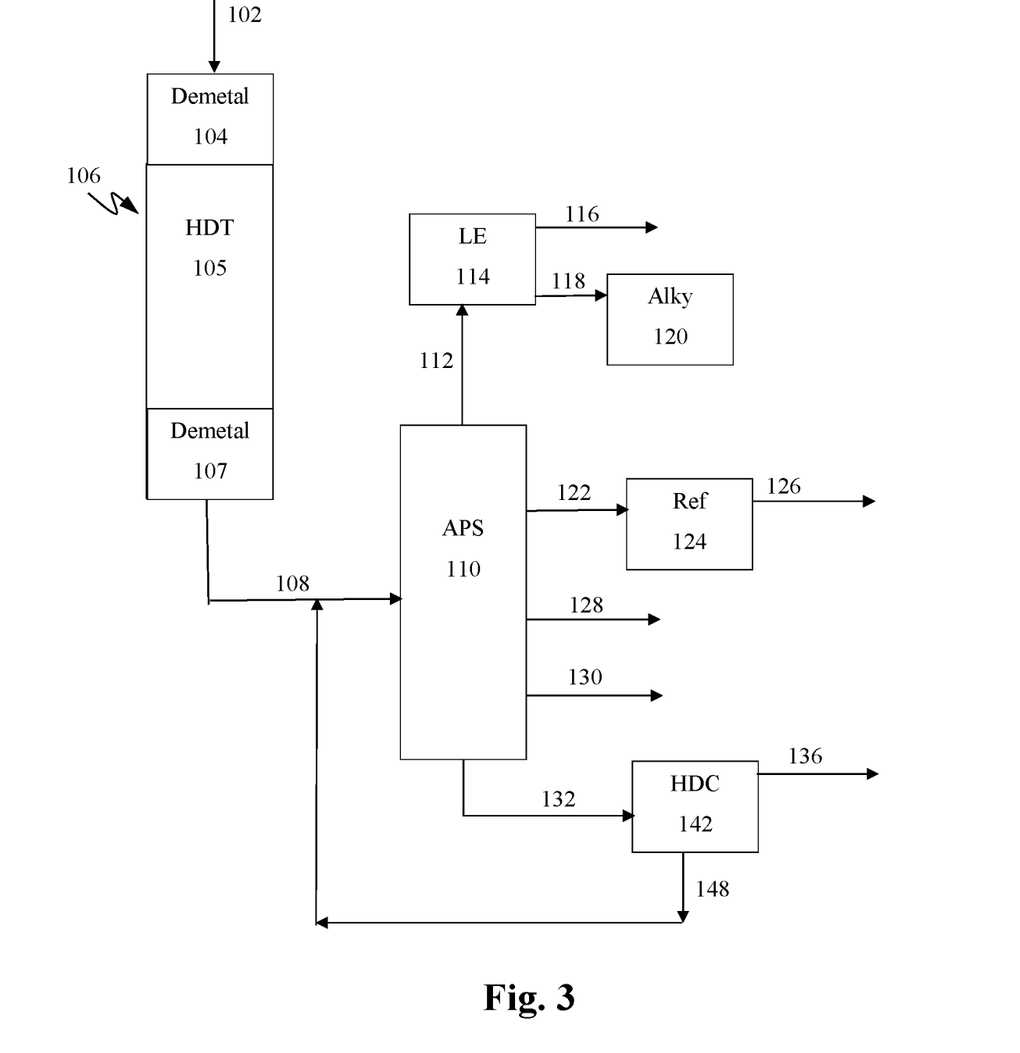
FIG. 3 depicts a further aspect of a whole crude hydrotreating process flow.

FIG. 3 depicts another possible process flow for refining low heteroatom content tight oil with a different configuration for processing the fifth petroleum distillate stream 132

(atmospheric bottom end). If diesel fuel is the primary target product, a HDC product stream 148 may be fed back into the atmospheric distillation tower 110 increasing the yield of ULSD in the fourth petroleum distillate stream 130, or purged in an emission control area (ECA) or according to International Maritime Organization (IMO) requirements. One of skill in the art will recognize that while the process can typically achieve conversion of heavy products of over 95%, it may be necessary to provide a bleed steam to avoid heavy aromatic build up.

It is contemplated that hydrotreating a whole crude tight oil having low heteroatom content as depicted in FIGS. 1-3 results in simplified distillate product streams. As a result of the simplified distillate product streams, the process is more flexible and significant cost savings may be realized either through reductions in energy consumption and/or capital expenditures to build and operate the process.

Figure 4:
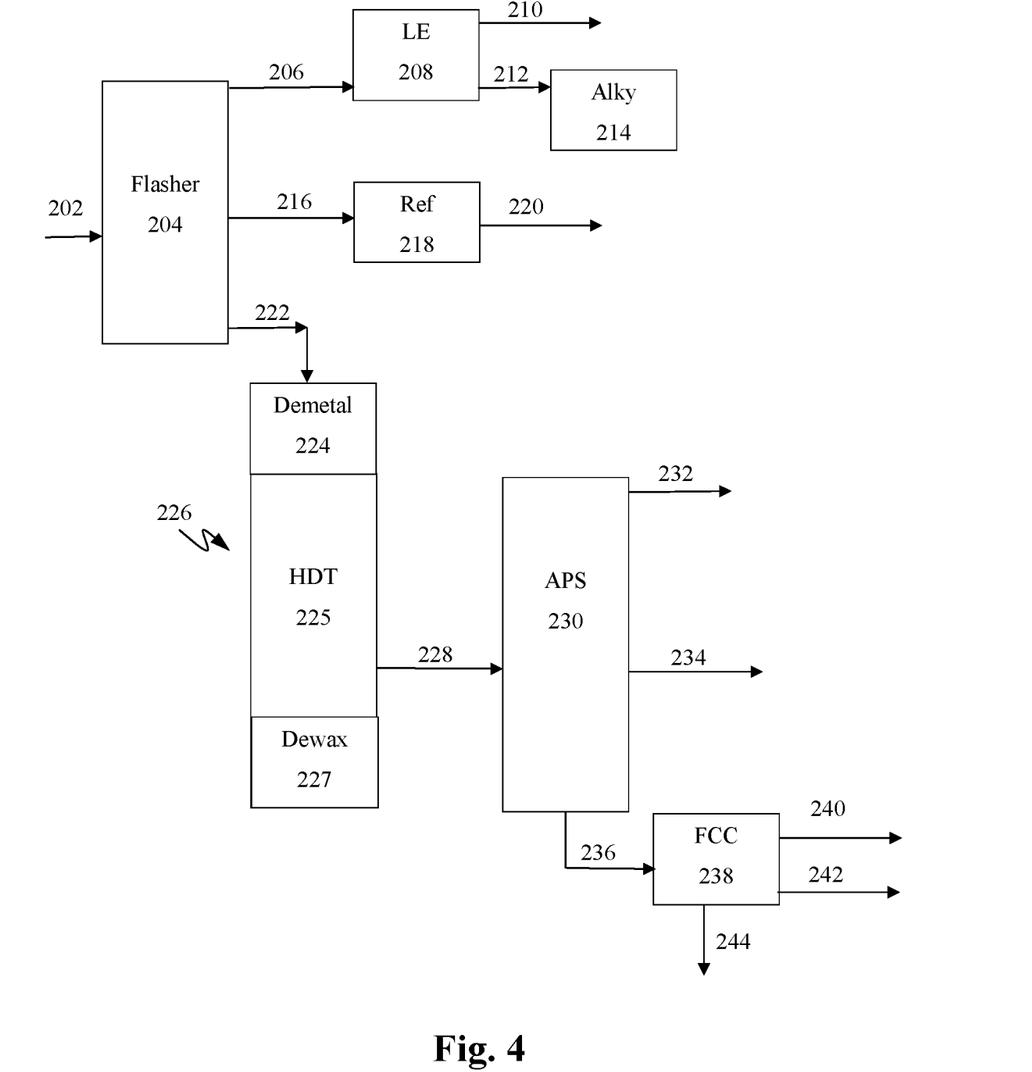
FIG. 4 illustrates a whole crude wide cut hydrotreating process flow.

Turning now to FIG. 4, a whole crude refining process flow is depicted that refines a whole crude tight oil stream 202. Whole crude tight oil stream 202 flows into the flash separator 204 to begin the refining process. A first flash product stream 206 comprises the same atmospheric top end distillates as the first petroleum distillate stream 112 in process flow 100 flows in to a light ends processing unit 208 to produce a light ends treated streams 210, which may contain a variety of products. The variety and composition of the light ends treated streams 210 may depend on the desired output and separation processes utilized in the light ends processing unit 208. An iso-butane stream 212 also flows from the light ends processing unit 208 into an alkylation unit 214 for further processing.

A second flash product stream 216 comprises naphtha. The low sulfur content and high naphtha concentration the whole crude tight oil stream 202 may permit flowing the second flash product stream 216 directly into a naphtha reformer 218 to produce a reformed stream 220, which may comprise low sulfur high-octane gasoline and/or pure chemical feedstocks (benzene, toluene, xylene, which may also be known as BTX). In some circumstances, it may be desirable to hydrotreat the second flash product stream 216 before it is directed into a naphtha reformer 218. The low sulfur content permit the reformer stream 220 to be added directly to the gasoline product stream without additional desulfurization.

The remaining fraction from the flash separator 204 is a kero plus stream 222 comprising kerosene and the remaining heavy fractions of the whole crude tight oil stream 202. The kero plus stream 222 is transferred to a hydrotreatment reactor 226 that includes a demetalization reactor bed 224, a hydroprocessing reactor bed 225, and a dewaxing reactor bed 227. The hydrotreatment reactor 226 may be similar in some respects to hydrotreatment reactor 106, and may be best understood with reference thereto. The kero plus stream 222 is processed through the hydrotreatment reactor 226 to produce a treated stream 228 that flows to an atmospheric distillation tower 230. There the treated stream 228 is distilled into multiple petroleum distillate streams.

The distillate streams produced by the atmospheric distillation tower 230 are simplified and reduced as a result of the flash separator 204 removing the light ends and naphtha components of the whole crude tight oil stream 202, such that the atmospheric distillation tower 230 produces three streams. A first petroleum distillate stream 232 comprises ULSK and, in some cases, may flow directly to fuel stocks without requiring further processing. A second petroleum distillate stream 234 comprises ULSD and may also, in some cases, flow directly to fuel stocks without requiring further processing. Similar to the atmospheric bottom end 132 shown in FIG. 1, a third petroleum distillate stream 236 has low sulfur, nitrogen, and aromatics that may remove the requirement for any pre-treating before being fed into FCC 238. Similar to the FCC 134 shown in FIG. 1, the FCC 238 may produce multiple product streams. As shown in FIG. 4, three product streams are produced: naphtha stream 240, light cycle oil stream 242, and low sulfur slurry oil stream 244. The naphtha stream 240 may be directly blended with gasoline from the reformer stream 220. Similarly, the light cycle oil stream 242 may flow from the FCC 238 to be directly blended with ULSD from the second petroleum distillate stream 234. Finally, a very low sulfur slurry oil product stream 244 may be used as a blending component for low sulfur MGO. Thus, similar to the process flow shown in FIG. 1, flash separating and hydrotreating the whole crude tight oil stream 202 before atmospheric distillation provides flexibility in the post-distillation processing options.

Figure 5:
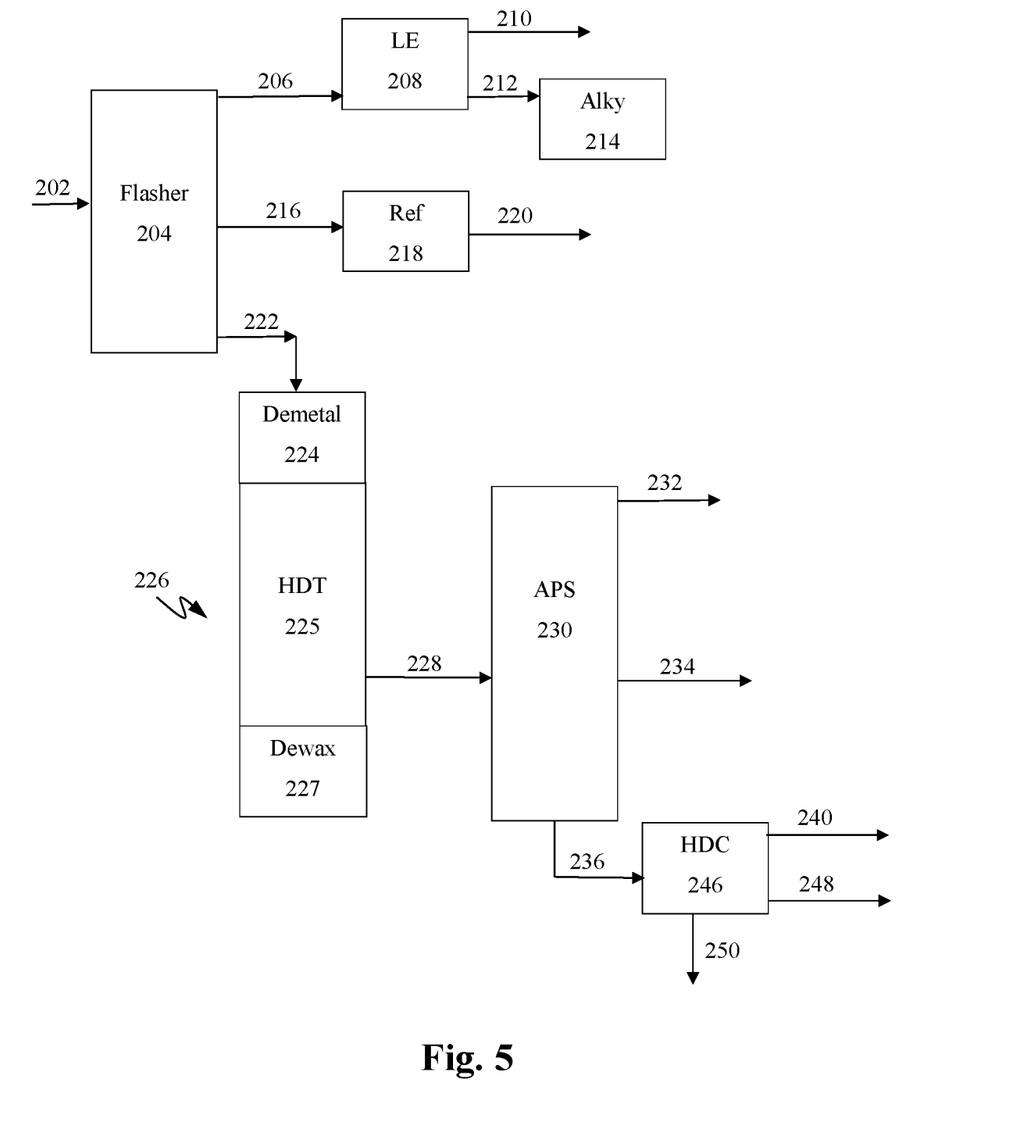
FIG. 5 depicts another aspect of a whole crude wide cut hydrotreating process flow.

FIG. 5 depicts the process flow shown in FIG. 4 having a different atmospheric bottom end similar to the configuration depicted for process flow shown in FIG. 2. The FCC 238 is replaced with an HDC 246 that produces three product streams: naphtha stream 240, ULSD stream 248, and lubricant product stream 250. Just as described above, naphtha stream 240 may still be directly blended with gasoline from the reformer stream 220 and ULSD stream 248 may be directly blended with the second petroleum distillate stream 234, which also comprises ULSD. Finally, a lubricant product stream 250, which may comprise a variety of different products, depending on the process configuration and choice of catalyst, may be produced by the HDC 246.

Figure 6:
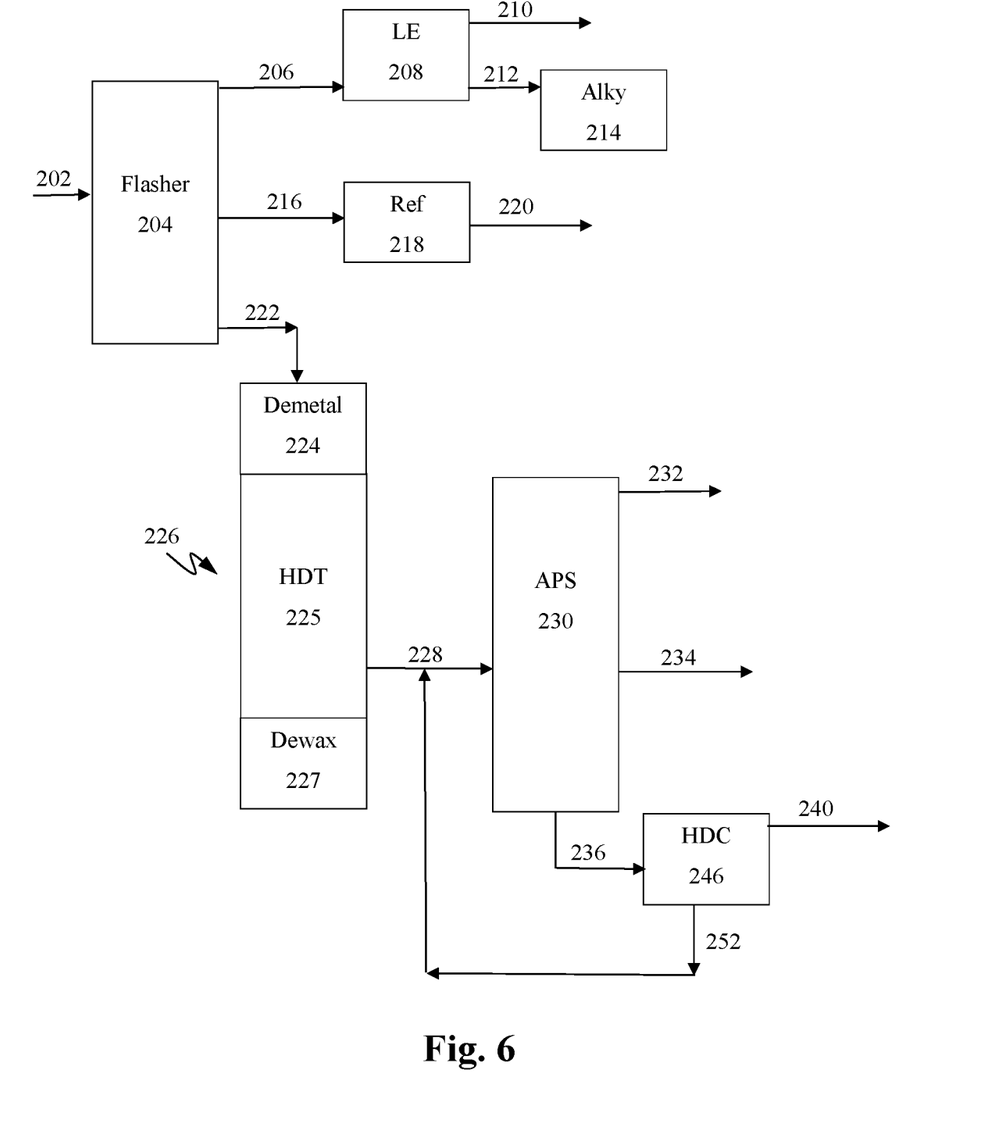
FIG. 6 depicts a further aspect of a whole crude wide cut hydrotreating process flow.

FIG. 6 depicts another possible configuration for the process flow shown in FIG. 4 for refining low heteroatom content tight oil with a different configuration for processing the third petroleum distillate stream 236 (atmospheric bottom end). If diesel fuel is the primary target product, a HDC product stream 252 may be fed back into the atmospheric distillation tower 230 increasing the yield of ULSD in the second petroleum distillate stream 234.

Figure 7:
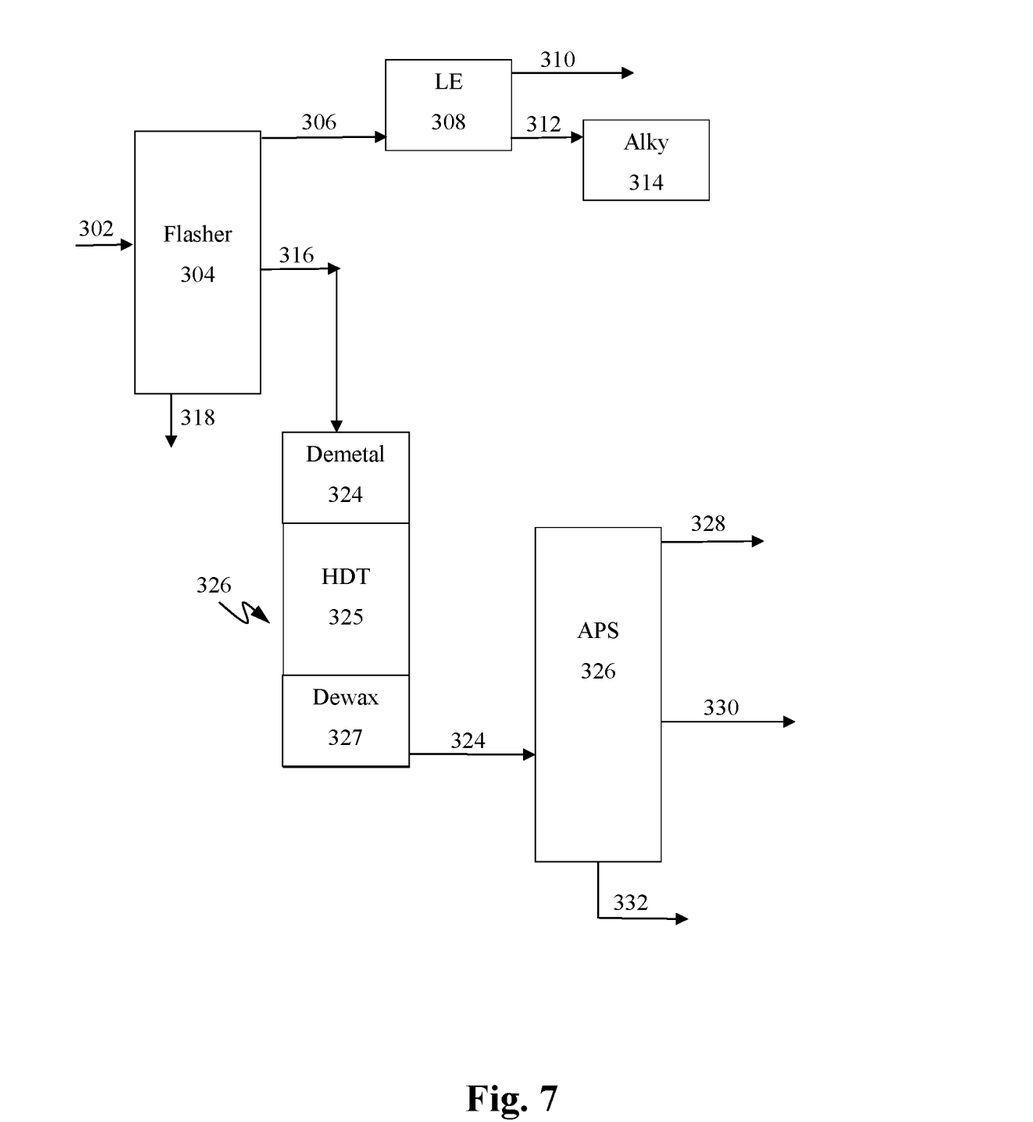
FIG. 7 depicts a further aspect of a whole crude wide cut hydrotreating process flow.

Turning now to FIG. 7, a whole crude refining process flow is depicted that refines a whole crude tight oil stream 302. Whole crude tight oil stream 302 flows into the flash separator 304 to begin the refining process. A first flash product stream 306 (flash light ends stream) comprises the same atmospheric top end distillates as the first petroleum distillate stream 112 in process flow 100 flows in to a light ends processing unit 308 to produce a light ends treated streams 310, which may contain a variety of products. The variety and composition of the light ends treated streams 310 may depend on the desired output and separation processes utilized in the light ends processing unit 308. An iso-butane stream 312 also flows from the light ends processing unit 308 into an alkylation unit 314 for further processing.

A third flash product stream 316 (flash middle stream) comprises a diesel stream that is first processed through a hydrotreating reactor 326 that includes a demetalization reactor bed 324, a hydroprocessing reactor bed 325, and a dewaxing reactor bed 327. The hydrotreatment reactor 326 may be similar in some respects to hydrotreatment reactor 106, and may be best understood with reference thereto. Having been hydrotreated, treated stream 324 enters atmospheric distillation tower 326. There the treated stream 324 is distilled into multiple petroleum distillate streams.

The distillate streams produced by the atmospheric distillation tower 326 are simplified and reduced as a result of the flash separator 304 removing the light ends components of the whole crude tight oil stream 302, such that the atmospheric distillation tower 326 produces three streams. A first petroleum distillate stream 328 comprises primarily naphtha. A second petroleum distillate stream 330 comprises ULSK and may also, in some cases, flow directly to fuel stocks without requiring further processing. A third petroleum distillate stream 330 comprises ULSD. The flash bottom 318 (flash heavy ends stream) can be used as a blending component for low sulfur Marine Gas Oil (MGO), and/or sold as fuel for Emission Control Area (ECA) fuel.

Figure 8:
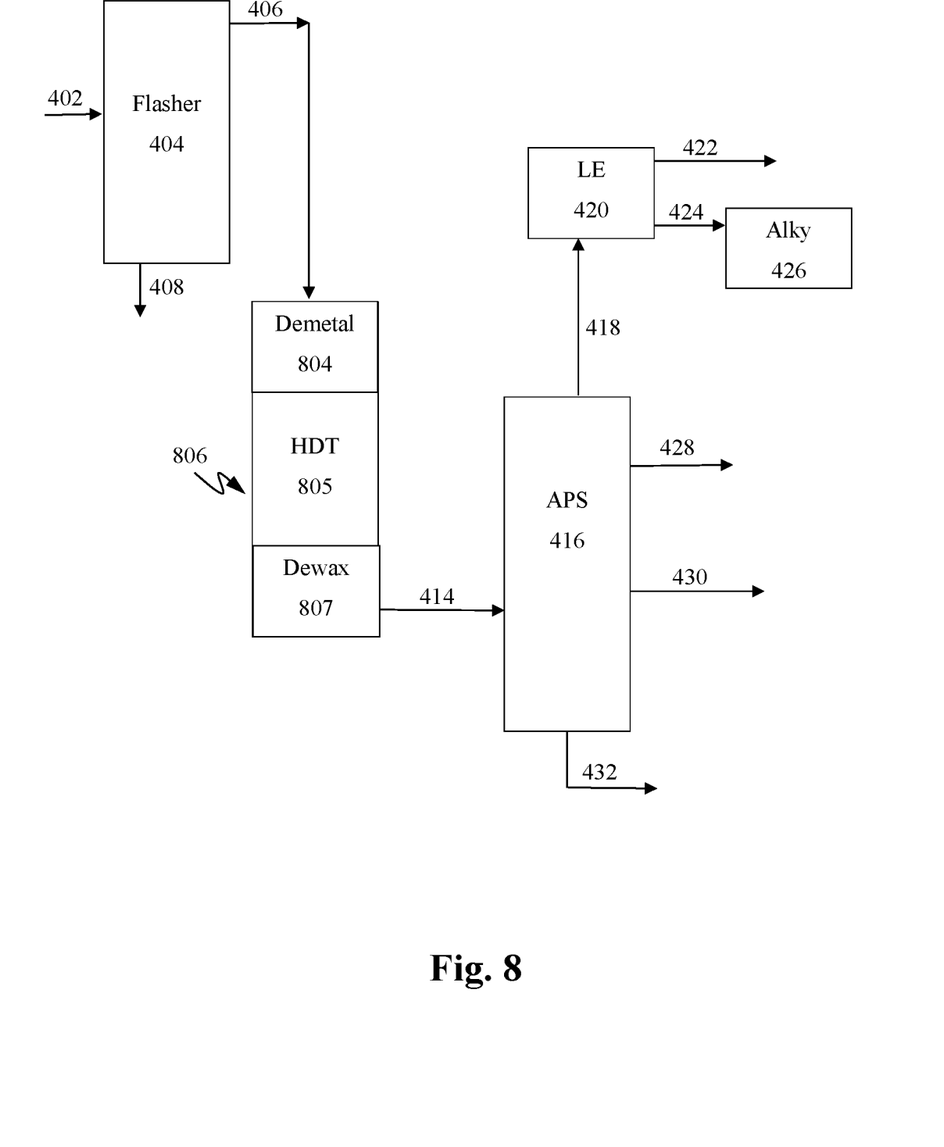
FIG. 8 depicts a further aspect of a whole crude wide cut hydrotreating process flow.

Turning now to FIG. 8, a whole crude refining process flow is depicted that refines a whole crude tight oil stream 402. Whole crude tight oil stream 402 flows into the flash separator 404 to begin the refining process. A first flash product stream 406 comprises a stream comprising diesel and lighter components, and the remainder of the whole crude tight oil stream exits the flasher through second flash product stream 408. While not shown, second flash product stream 408 may be further separated through atmospheric distillation, hydrotreating, or fluid catalytic cracking. Second flash product stream 408 can be used as a blending component for low sulfur Marine Gas Oil (MGO), and/or sold as fuel for Emission Control Area (ECA) fuel.

First flash product stream 406 exits the flasher and enters hydrotreament reactor a hydrotreating reactor 806 that includes a demetalization reactor bed 805, a hydroprocessing reactor bed 805, and a dewaxing reactor bed 807. The hydrotreatment reactor 806 may be similar in some respects to hydrotreatment reactor 106, and may be best understood with reference thereto. Having been hydrotreated, treated stream 414 enters atmospheric distillation tower 416. There the treated stream 414 is distilled into multiple petroleum distillate streams.

A distillate stream 418 (light ends distillate stream) comprises the same atmospheric top end distillates as the first petroleum distillate stream 112 in process flow 100 flows in to a light ends processing unit 420 to produce a light ends treated streams 422, which may contain a variety of products. An iso-butane stream 424 also flows from the light ends processing unit 420 into an alkylation unit 426 for further processing. A second petroleum distillate stream 428 comprises primarily naphtha. A third petroleum distillate stream 430 comprises ULSK and may also, in some cases, flow directly to fuel stocks without requiring further processing. A fourth petroleum distillate stream 432 comprises ULSD.

It is contemplated that flash separating and hydrotreating a whole crude tight oil before distillation as disclosed above and depicted in FIGS. 4-8 creates significant cost and product efficiencies compared to traditional crude oil refining process flows.

Reactor Bed Arrangement

Hydrotreating reactors disclosed herein (e.g., 106, 226, 326, and 806) can contain one or more beds, which can include demetalization reactor beds, a hydroprocessing reactor beds, and a dewaxing reactor beds in various arrangements. While the above examples present the reactor beds configured such that a treated stream contacts the demetalization reactor bed first, followed by the hydroprocessing reactor bed and the dewaxing reactor bed in sequence, other arrangements are possible, as presented in FIGS. 9A and 9B.

Figure 9A:
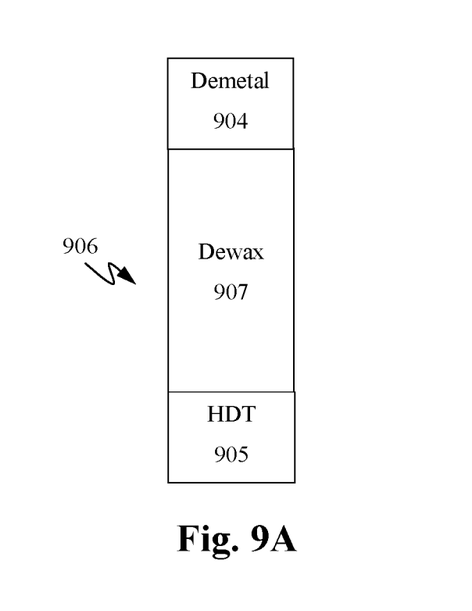
FIGS. 9A and 9B depict various reactor bed configurations in accordance with the present disclosure.
Figure 9B:
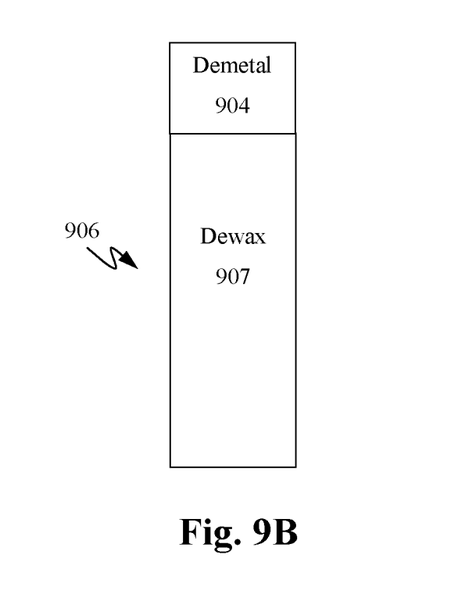

In the example presented in FIG. 9A, a hydrotreating reactor 906 can include a dewaxing reactor bed 906 arranged after a demetalization reactor bed 904 and before a hydroprocessing reactor bed 905. In some embodiments, a hydrotreating reactor may exclude a dedicated hydroprocessing reactor bed and rely on the dewaxing catalyst to perform hydrotreating and dewaxing treatments. As shown in FIG. 9B, the hydrotreating reactor 906 can include the demetalization reactor bed 904 arranged before the dewaxing reactor bed 907. In addition, the individual reactor beds within a hydrorpocessing reactor can be configured as stacks, mixed in a single bed, configured as a gradient, or combinations thereof.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Example Embodiments

Embodiments disclosed herein include:

A. The methods of refining a whole crude oil include: feeding a whole crude oil stream into a hydrotreating reactor comprising a dewaxing reactor bed and one or more selected from a group consisting of a demetalization reactor bed and a hydroprocessing reactor bed; processing the whole crude oil stream within the hydrotreating reactor to create a treated stream; feeding the treated stream into the distillation tower; and processing the treated stream within the distillation tower to create one or more petroleum distillate streams.

B. The methods of refining a whole crude oil stream include: feeding the whole crude oil stream into a flash evaporation separator; processing the whole crude oil stream within the flash evaporation separator to create a plurality of flashed streams comprising at least one of a light ends stream, a flashed naphtha stream, and a kero plus stream; feeding the kero plus stream into a hydrotreating reactor comprising a dewaxing reactor bed and one or more selected from a group consisting of a demetalization reactor bed and a hydroprocessing reactor bed; processing the kero plus stream within the hydrotreating reactor to create a treated stream; and processing the treated stream within the distillation tower.

C. The methods of refining a whole crude oil stream include: feeding the whole crude oil stream into a flash evaporation separator to create a flash light ends stream, a flash middle stream, and a flash heavy ends stream; processing the flash middle stream within a hydrotreating reactor a hydrotreating reactor comprising a dewaxing reactor bed and one or more selected from a group consisting of a demetalization reactor bed and a hydroprocessing reactor bed to create a treated stream; feeding the treated stream into the distillation tower; and processing the treated stream within the distillation tower to create one or more petroleum distillate streams.

D. The methods of refining a whole crude oil stream include: feeding the whole crude oil stream into a flash evaporation separator to create a flash light ends stream and a flash heavy ends stream; processing the flash light ends stream within a hydrotreating reactor a hydrotreating reactor comprising a dewaxing reactor bed and one or more selected from a group consisting of a demetalization reactor bed and a hydroprocessing reactor bed to create a treated stream; feeding the treated stream into the distillation tower; and processing the treated stream within the distillation tower to create one or more petroleum distillate streams.

Embodiments A-D may have one or more of the following additional elements in any combination:

Element 1: wherein the whole crude oil stream comprises at least one of a boiling point range between about T5 90° F. to about T95 1200° F., less than about 1 wt % sulfur, and less than about 35 wt % aromatics.

Element 2: wherein the hydrotreating reactor comprises the dewaxing reactor bed, the demetalization reactor bed, the hydroprocessing reactor bed, wherein the dewaxing reactor bed is arranged to contact an incoming stream after the demetalization reactor bed and before the hydroprocessing reactor bed.

Element 3: wherein the hydrotreating reactor comprises the dewaxing reactor bed and the demetalization reactor bed, wherein the dewaxing reactor bed is arranged to contact an incoming stream after the demetalization reactor bed.

Element 4: wherein the method further comprises feeding the whole crude oil stream into a flash evaporation separator prior to the hydrotreating reactor; processing the whole crude oil stream within the flash evaporation separator to create a plurality of flashed streams comprising at least one of a light ends stream, a flashed naphtha stream, and a kero plus stream; and feeding the kero plus stream into the hydrotreating reactor.

Element 5: wherein the one or more petroleum distillate streams comprises a bottom petroleum distillate stream and further comprising: providing a fluid catalytic cracker in series with the bottom petroleum distillate stream from the distillation tower; feeding the bottom petroleum distillate stream into the fluid catalytic cracker; and processing the bottom petroleum distillate stream within the fluid catalytic cracker to create at least one fluid catalytic cracker stream.

Element 6: wherein the at least one fluid catalytic cracker stream comprises at least a catalytic naphtha stream and a light cycle oil stream.

Element 7: wherein the method further comprises: feeding at least one of the catalytic naphtha stream and the light cycle oil stream into one or more of the petroleum distillate streams without further processing.

Element 8: wherein the one or more petroleum distillate streams comprises a bottom petroleum distillate stream and further comprising: providing a hydrocracker in series with the bottom petroleum distillate stream from the distillation tower; feeding the bottom petroleum distillate stream into the hydrocracker; and processing the bottom petroleum distillate stream within the hydrocracker to create at least one hydrocracker stream.

Element 9: wherein the method further comprises feeding the at least one hydrocracker stream into the distillation tower; and processing the at least one hydrocracker stream within the distillation tower.

Element 10: wherein the whole crude oil stream comprises at least one of a boiling point range between about 90° F. to about 1100° F., less than about 1 wt % sulfur, and less than about 20 wt % aromatics.

Element 11: wherein the method further comprises: feeding the flashed naphtha stream into a naphtha reformer; and processing the flashed naphtha stream in the naphtha reformer to create a reformate stream.

Element 12: wherein the method further comprises: creating a first petroleum distillate stream in the distillation tower comprising an ultralow sulfur kerosene product; creating a second petroleum distillate stream in the distillation tower comprising an ultralow sulfur diesel fuel product; and creating a bottom petroleum distillate stream in the distillation tower.

Element 13: wherein the method further comprises: providing a fluid catalytic cracker; feeding the bottom distillate stream into a fluid catalytic cracker; processing the bottom distillate stream in the fluid catalytic cracker; creating a catalytic naphtha stream within the fluid catalytic cracker; and creating a light cycle oil stream within the fluid catalytic cracker.

Element 14: wherein the method further comprises: blending the catalytic naphtha stream with the reformate stream; and blending the light cycle oil stream with the ultralow sulfur diesel fuel product.

Element 15: wherein the method further comprises providing a hydrocracker; feeding the bottom distillate stream into the hydrocracker; processing the bottom distillate stream in the hydrocracker.

Element 16: wherein the method further comprises: creating a naphtha stream in the hydrocracker; and creating a high cetane hydrocracker diesel stream in the hydrocracker.

Element 17: wherein the method further comprises: blending the catalytic naphtha stream with the reformate stream; and blending the high cetane hydrocracker diesel stream with the ultralow sulfur diesel fuel product.

Element 18: wherein the method further comprises creating at least one hydrocracker stream with the hydrocracker; feeding the at least one hydrocracker stream into the distillation tower.

Element 19: wherein the method further comprises processing the flash light ends stream in a light ends processing unit.

Element 20: wherein the one or more petroleum distillate streams includes a light ends distillate stream and processing the light ends distillate stream in a light ends processing unit.

To facilitate a better understanding of the embodiments of the present invention, the following examples of preferred or representative embodiments are given. In no way should the following examples be read to limit, or to define, the scope of the invention.

Example

In the following example, a crude stream (Permian Crude A) is treated using a combined hydrotreatment and dewaxing process in accordance with the methods disclosed herein in a pilot plant unit under a variety of conditions. As shown in Table 2, the treated diesel products exhibit reduced sulfur content and improved cold flow properties compared to the starting crude.

TABLE 2

| | Permian Crude A | Hydrotreating and Hydrodewaxing of Permian Crude A | | |
|---|---|---|---|---|
| Temperature (° F.) | | 625 | 625 | 625 |
| Pressure (psig) | | 500 | 500 | 650 |
| LHSV (h-1) | | 1.50 | 1.00 | 1.00 |
| TGR, scf/bbl | | 1200 | 1200 | 2400 |
| Sulfur, ppm | | | | |
| IBP-350 | 14.3 | <0.2 | <0.2 | 0.3 |
| 350-700 | 59.9 | 10.2 | 7.8 | 2.3 |
| 700+ | 312 | 60.2 | 36.7 | 22.6 |
| Nitrogen, ppm | | | | |
| IBP-350 | 0.2 | <0.2 | 0.4 | 0.4 |
| 350-700 | 7.4 | 6.3 | 3.9 | 2 |
| 700+ | 167 | 109 | 85 | 62 |
| Diesel Properties | | | | |
| API | 40.9 | 40.9 | 41.5 | 41.5 |
| S, ppm | 59.9 | 10.2 | 7.8 | 2.3 |
| N, ppm | 7.4 | 6.3 | 3.9 | 2 |
| Cloud Point, ° C. | −5 | −8 | −10 | −17 |
| Freezing Point, ° C. | −2.9 | −4.7 | −8 | −8.4 |

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method of refining a whole crude oil stream, the method comprising:
feeding the whole crude oil stream into a hydrotreating reactor comprising a dewaxing reactor bed and one or more selected from a group consisting of a demetalization reactor bed and a hydroprocessing reactor bed;
processing the whole crude oil stream within the hydrotreating reactor to create a treated stream;
feeding the treated stream into the distillation tower; and
processing the treated stream within the distillation tower to create one or more petroleum distillate streams.

2. The method of claim 1, wherein the whole crude oil stream comprises at least one of a boiling point range between about T5 90° F. to about T95 1200° F. and less than about 1 wt % sulfur, and less than about 35 wt % aromatics.

3. The method of claim 1, wherein the hydrotreating reactor comprises the dewaxing reactor bed, the demetalization reactor bed, the hydroprocessing reactor bed, wherein the dewaxing reactor bed is arranged to contact the whole crude oil stream after the demetalization reactor bed and before the hydroprocessing reactor bed.

4. The method of claim 1, wherein the hydrotreating reactor comprises the dewaxing reactor bed and the demetalization reactor bed, wherein the dewaxing reactor bed is arranged to contact the whole crude oil after the demetalization reactor bed.

5. The method of claim 1, further comprising:
feeding the whole crude oil stream into a flash evaporation separator prior to the hydrotreating reactor;
processing the whole crude oil stream within the flash evaporation separator to create a plurality of flashed streams comprising at least one of a light ends stream, a flashed naphtha stream, and a kero plus stream; and
feeding the kero plus stream into the hydrotreating reactor.

6. The method of claim 1 wherein the one or more petroleum distillate streams comprises a bottom petroleum distillate stream and further comprising:
providing a fluid catalytic cracker in series with the bottom petroleum distillate stream from the distillation tower;
feeding the bottom petroleum distillate stream into the fluid catalytic cracker; and
processing the bottom petroleum distillate stream within the fluid catalytic cracker to create at least one fluid catalytic cracker stream.

7. The method of claim 6, wherein the at least one fluid catalytic cracker stream comprises at least a catalytic naphtha stream and a light cycle oil stream.

8. The method of claim 7 further comprising:
feeding at least one of the catalytic naphtha stream and the light cycle oil stream into one or more of the petroleum distillate streams without further processing.

9. The method of claim 1, wherein the one or more petroleum distillate streams comprises a bottom petroleum distillate stream and further comprising:
providing a hydrocracker in series with the bottom petroleum distillate stream from the distillation tower;
feeding the bottom petroleum distillate stream into the hydrocracker; and
processing the bottom petroleum distillate stream within the hydrocracker to create at least one hydrocracker stream.

10. The method of claim 9, further comprising:
feeding the at least one hydrocracker stream into the distillation tower; and
processing the at least one hydrocracker stream within the distillation tower.

11. A method of refining a whole crude oil stream, the method comprising:

feeding the whole crude oil stream into a flash evaporation separator, the whole crude comprising less than about 20 wt % aromatics and 0.012 wt % or less of sulfur;
processing the whole crude oil stream within the flash evaporation separator to create a plurality of flashed streams comprising at least one of a light ends stream, a flashed naphtha stream, and a kero plus stream;
feeding the kero plus stream into a hydrotreating reactor comprising a dewaxing reactor bed and one or more selected from a group consisting of a demetalization reactor bed and a hydroprocessing reactor bed;
processing the kero plus stream within the hydrotreating reactor to create a treated stream; and
processing the treated stream within the distillation tower.

12. The method of claim 11, wherein the whole crude oil stream comprises at least one of a boiling point range between about 90° F. to about 1100° F. and less than about 1 wt % sulfur.

13. The method of claim 11, further comprising:
feeding the flashed naphtha stream into a naphtha reformer; and
processing the flashed naphtha stream in the naphtha reformer to create a reformate stream.

14. The method of claim 11, further comprising:
creating a first petroleum distillate stream in the distillation tower comprising an ultralow sulfur kerosene product;
creating a second petroleum distillate stream in the distillation tower comprising an ultralow sulfur diesel fuel product; and
creating a bottom petroleum distillate stream in the distillation tower.

15. The method of claim 12 further comprising:
providing a fluid catalytic cracker;
feeding the bottom distillate stream into a fluid catalytic cracker;
processing the bottom distillate stream in the fluid catalytic cracker;
creating a catalytic naphtha stream within the fluid catalytic cracker; and
Creating a light cycle oil stream within the fluid catalytic cracker.

16. The method of claim 15, further comprising:
blending the catalytic naphtha stream with the reformate stream; and
blending the light cycle oil stream with the ultralow sulfur diesel fuel product.

17. The method of claim 16, further comprising:
providing a hydrocracker;
feeding the bottom distillate stream into the hydrocracker;
processing the bottom distillate stream in the hydrocracker.

18. The method of claim 17, further comprising:
creating a naphtha stream in the hydrocracker; and
creating a high cetane hydrocracker diesel stream in the hydrocracker.

19. The method of claim 18, further comprising:
blending the catalytic naphtha stream with the reformate stream; and
blending the high cetane hydrocracker diesel stream with the ultralow sulfur diesel fuel product.

20. The method of claim 17, further comprising:
creating at least one hydrocracker stream with the hydrocracker;
feeding the at least one hydrocracker stream into the distillation tower.

21. A method of refining a whole crude oil stream, the method comprising:
feeding the whole crude oil stream into a flash evaporation separator to create a flash light ends stream, a flash middle stream, and a flash heavy ends stream;
processing the flash middle stream within a hydrotreating reactor a hydrotreating reactor comprising a dewaxing reactor bed and one or more selected from a group consisting of a demetalization reactor bed and a hydroproces sing reactor bed to create a treated stream, the dewaxing reactor bed being arranged to contact the flash middle stream after the demetalization reactor bed;
feeding the treated stream into the distillation tower; and
processing the treated stream within the distillation tower to create one or more petroleum distillate streams.

22. The method of claim 21, further comprising processing the flash light ends stream in a light ends processing unit.

23. A method of refining a whole crude oil stream, the method comprising:
feeding the whole crude oil stream into a flash evaporation separator to create a flash light ends stream and a flash heavy ends stream;
processing the flash light ends stream within a hydrotreating reactor a hydrotreating reactor comprising a dewaxing reactor bed and a demetalization reactor bed to create a treated stream, the dewaxing reactor bed being arranged to contact the flash middle stream after the demetalization reactor bed;
feeding the treated stream into the distillation tower; and
processing the treated stream within the distillation tower to create one or more petroleum distillate streams.

24. The method of claim 23, wherein the one or more petroleum distillate streams includes a light ends distillate stream and processing the light ends distillate stream in a light ends processing unit.

* * * * *